United States Patent
Li et al.

(10) Patent No.: US 8,934,715 B2
(45) Date of Patent: Jan. 13, 2015

(54) HUMAN POSE ESTIMATION IN VISUAL COMPUTING

(71) Applicant: Intel Corporation, Santa Clara, CA (US)

(72) Inventors: Changcheng Li, Beijing (CN); XiaoFeng Tong, Beijing (CN)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 13/970,809

(22) Filed: Aug. 20, 2013

(65) Prior Publication Data

US 2013/0336556 A1 Dec. 19, 2013

Related U.S. Application Data

(62) Division of application No. 12/459,141, filed on Jun. 26, 2009, now Pat. No. 8,520,946.

(51) Int. Cl.
- *G06K 9/34* (2006.01)
- *G06K 9/46* (2006.01)
- *G06K 9/00* (2006.01)
- *G06K 9/62* (2006.01)

(52) U.S. Cl.
CPC .......... *G06K 9/00342* (2013.01); *G06K 9/6297* (2013.01)
USPC .......................................... 382/173; 382/190

(58) Field of Classification Search
None
See application file for complete search history.

(56) References Cited

U.S. PATENT DOCUMENTS

| | | | | |
|---|---|---|---|---|
| 7,940,960 | B2* | 5/2011 | Okada | 382/103 |
| 8,724,906 | B2* | 5/2014 | Shotton et al. | 382/218 |
| 2003/0034979 | A1* | 2/2003 | Nakamura et al. | 345/474 |
| 2003/0179204 | A1* | 9/2003 | Mochizuki et al. | 345/473 |
| 2007/0146371 | A1* | 6/2007 | Dariush | 345/474 |
| 2010/0278384 | A1* | 11/2010 | Shotton et al. | 382/103 |

OTHER PUBLICATIONS

Collins, Michael. "Three generative, lexicalised models for statistical parsing." Proceedings of the 35th Annual Meeting of the Association for Computational Linguistics and Eighth Conference of the European Chapter of the Association for Computational Linguistics. Association for Computational Linguistics, 1997.*

Wang, Yang, and Greg Mori. "Multiple tree models for occlusion and spatial constraints in human pose estimation." Computer Vision-ECCV 2008. Springer Berlin Heidelberg, 2008. 710-724.*

Ronfard, Rémi, Cordelia Schmid, and Bill Triggs. "Learning to parse pictures of people." Computer Vision-ECCV 2002. Springer Berlin Heidelberg, 2002. 700-714.*

* cited by examiner

*Primary Examiner* — Li Liu
(74) *Attorney, Agent, or Firm* — Trop, Pruner & Hu, P.C.

(57) ABSTRACT

The present invention discloses a method of estimating human pose comprising: modeling a human body as a tree structure; optimizing said tree structure through importance proposal probabilities and part priorities; performing foreground detection to create image region observation; and performing image segmentation to provide image edge observations.

19 Claims, 3 Drawing Sheets

HUMAN POSE ESTIMATION IN VISUAL COMPUTING

CROSS-REFERENCE TO RELATED APPLICATIONS

This application is a divisional of U.S. patent application Ser. No. 12/459,141, filed on Jun. 26, 2009.

BACKGROUND OF THE INVENTION

1. Field of the Invention

The present invention relates to a field of visual interactive gaming, and, more specifically, to an apparatus for and a method of estimating human pose.

2. Discussion of Related Art

Estimating human pose involves identification, characterization, and monitoring of various parts of a human body. It is often useful to determine size, shape, placement, and orientation of the body parts. The parts may include the head, the torso, the arms, and the legs.

Human pose estimation can be useful in many different applications, including visual interactive gaming, immersive reality, content-based image retrieval, visual surveillance, and health care monitoring for old and young people. Implementation of human pose estimation in the domains of visual computing and consumer electronics typically requires a combination of hardware and software.

However, human pose estimation may be difficult to perform effectively, efficiently, and consistently, especially in real time environment.

DETAILED DESCRIPTION OF THE PRESENT INVENTION

In the following description, numerous details, examples, and embodiments are set forth to provide a thorough understanding of the present invention. However, it will become clear and apparent to one of ordinary skill in the art that the invention is not limited to the details, examples, and embodiments set forth and that the invention may be practiced without some of the particular details, examples, and embodiments that are described. In other instances, one of ordinary skill in the art will further realize that certain details, examples, and embodiments that may be well-known have not been specifically described so as to avoid obscuring the present invention.

The present invention discloses an apparatus for and a method of estimating human pose. First, the torso of the human body is sampled. The sampling is then extended to the rest of the body. This approach only requires that a local extremum be determined at each step which is simpler than determining a global extremum. Second, the body part is not sequentially chosen to be changed. Instead, priorities of body parts in hierarchical tree model and probabilities of proposals are both considered. Third, as a Markov chain evolves, the part priorities, the part dynamic probabilities, and the state dynamic probabilities change and propagate.

Figure 1:
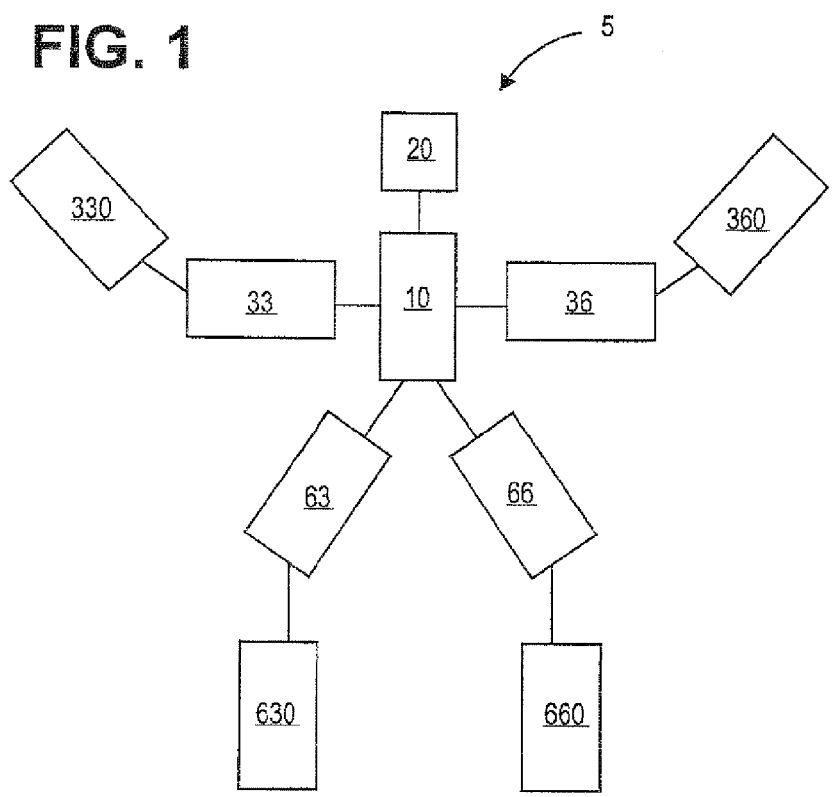
FIG. 1 shows a tree-structured human body model according to an embodiment of the present invention.

As shown in an embodiment of the present invention in FIG. 1, a human body 5 is modeled as a three-level tree structure. A torso 10 is a root while other parts are hierarchical branches. Directly attached to the torso 10 are a head 20, a left upper arm 33, a right upper arm 36, a left upper leg 63, and a right upper leg 66. Further attached to each of the upper arm/leg 33, 36, 63, and 66, is a corresponding lower arm/leg 330, 360, 630, and 660. The limbs include the upper and lower arms and legs.

Figure 2:
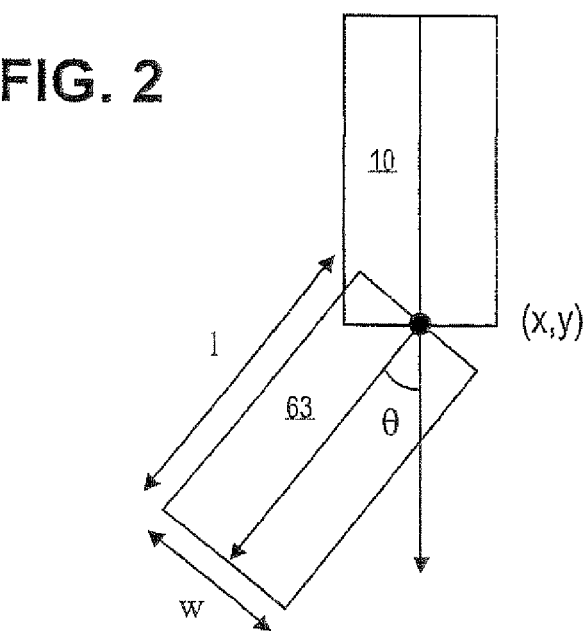
FIG. 2 shows body part states according to an embodiment of the present invention.

As shown in an embodiment of the present invention in FIG. 2, each body part is represented by a rectangle. The body part is characterized by 5 parameters: $\{x, y, \theta, l, w\}$. Location is represented as $(x, y)$. Orientation is represented as $\theta$. Length is represented as $l$. Width is represented as $w$.

A Bayesian formulation may be established first. Designating X as a state of a human body and I as an observation of an image, pose estimation may be formulated as a Bayesian inference for estimating a posterior distribution:

$$P(X|I) \propto P(I|X)P(X) \quad \text{formula (1)}$$

where $P(I|X)$ is a likelihood of observations for state X, and $P(X)$ is the body constraints.

A simple and common solution for this estimating problem is the maximum a posteriori (MAP) estimate which is given by $$X_{MAP} = \arg(\max x)P(X|I) \quad \text{formula (2)}$$

When calculating $P(I|X)$, we consider both foreground region likelihood $P_r(I|X)$ and edge likelihood $P_e(I|X)$, thus it can be written as the product of these two kinds of likelihood as follows:

$$P(I|X) = P_r(I|X)P_e(I|X)^\alpha \quad \text{formula (3)}$$

where $\alpha$ is an exponent factor for edge likelihood, which controls its weight to final likelihood calculation. Given a set of body states X, we can synthesize a human body. Then, the foreground likelihood and the edge likelihood can be calculated by comparing it to the foreground and edge map. $P(X)$ in formula (1) measures the constraints of the body, including spatial relations on location and orientation between two connected parts and length relations among body parts.

Figure 3:
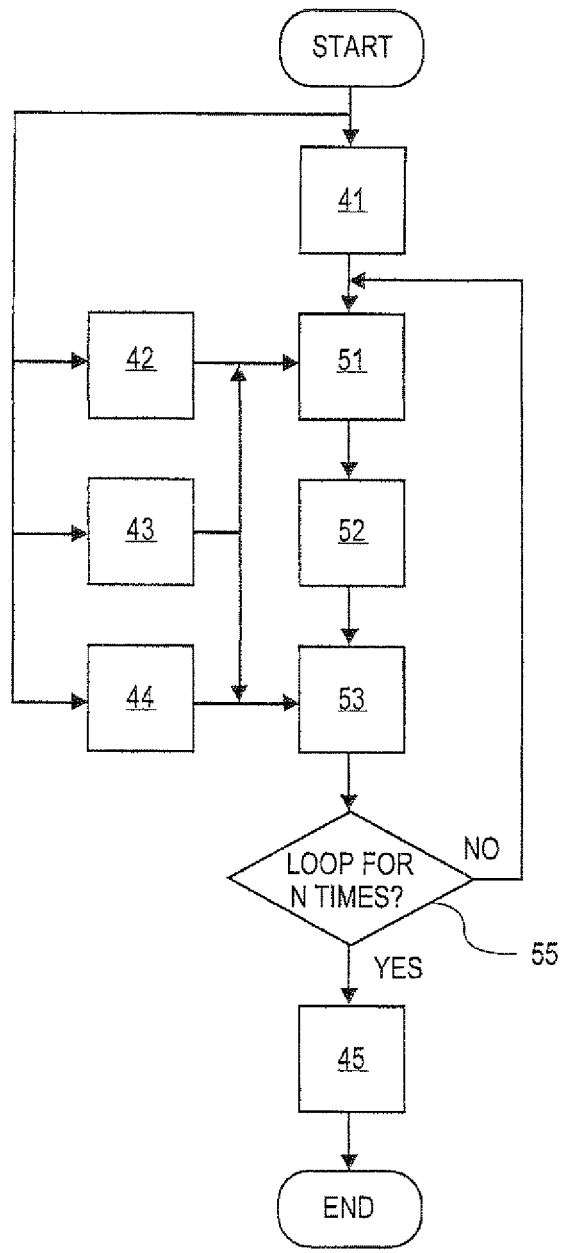
FIG. 3 shows a framework of a pose estimation method according to an embodiment of the present invention.

Next, an algorithm framework is set up. The framework of the algorithm is shown in FIG. 3. The inputs are source image 41, human bounding box 42, foreground 43, and edge map 44. The human bounding box 42 is obtained from a human detector module. The foreground 43 is obtained from a foreground extractor. The edge map 44 is obtained from image segmentation.

The pre-processes are not specially chosen; they only provide coarse initial results for later processes. Other alternative processes may also be used.

An initial torso is first sampled from proposals given by the human bounding box 42, the foreground 43, as well as the body constraints.

A bad torso is discarded by fast evaluation and rejection. Then, a new torso will be sampled until a good torso is obtained.

After a good torso is obtained, the states of other body parts are initialized according to the body constraints. Then, a local optimization is run under a data-driven Markov chain Monte Carlo (DDMCMC) framework to obtain local maximum of posterior probability. This process is repeated in a loop 55 for N times. Finally, the MAP solution 45 is recorded as the pose estimation result.

The details of the algorithm will be described next.

Initializing body states is done first. In the process of sampling an initial torso 51, the human bounding box 42 gives an estimation of body height. Proposed distribution of torso length l is obtained from the body height according to the body constraints, and then torso width w is obtained from torso length l. A body mask may be obtained by dilating the foreground. Then a distance transform is run on the body mask.

The larger a point's distance value in a distance map, the more likely it is going to be sampled as the torso center candidate. This produces proposals of the states x and y of the torso. The direction θ is sampled from a mixed Gaussian distribution. One element of the mixture is a perpendicular direction of the gradient of the center of the torso in the distance map. Another element of the mixture is a direction of the principal axis of the foreground 43.

A bad torso may be identified by pre-judgment. The criteria for a bad torso are: 1) the area of foreground above shoulders is larger than a certain threshold or 2) the background ratio in head or in torso is larger than a certain threshold. After the torso sampling, other body parts are initialized according to the body constraints. Then all states are set to their means.

Markov chain dynamics will be described next. Two kinds of dynamics are designed. Jump and diffusion represent large and small changes respectively of the states of the body part. For jump, the state is first resampled from its distribution. Then local optimization occurs on the subtree of the body (the root of the subtree is the chosen part. Body states will jump from one local maximum in a small state space to another local maximum that is nearby.

Dynamic diffusion corresponds to a small change in one state. For a current state s, the state is first updated as follows:

$$s'=s\pm\lambda+\epsilon \quad \text{formula (4)}$$

where λ is a step length and ε is Gaussian noise. The algebraic sign in front of λ is determined by judging whether the posterior probability increases or not. Then, the algebraic sign remains the same and formula (4) is run repeatedly until the posterior probability decreases or the state exceeds its range.

Figure 4:
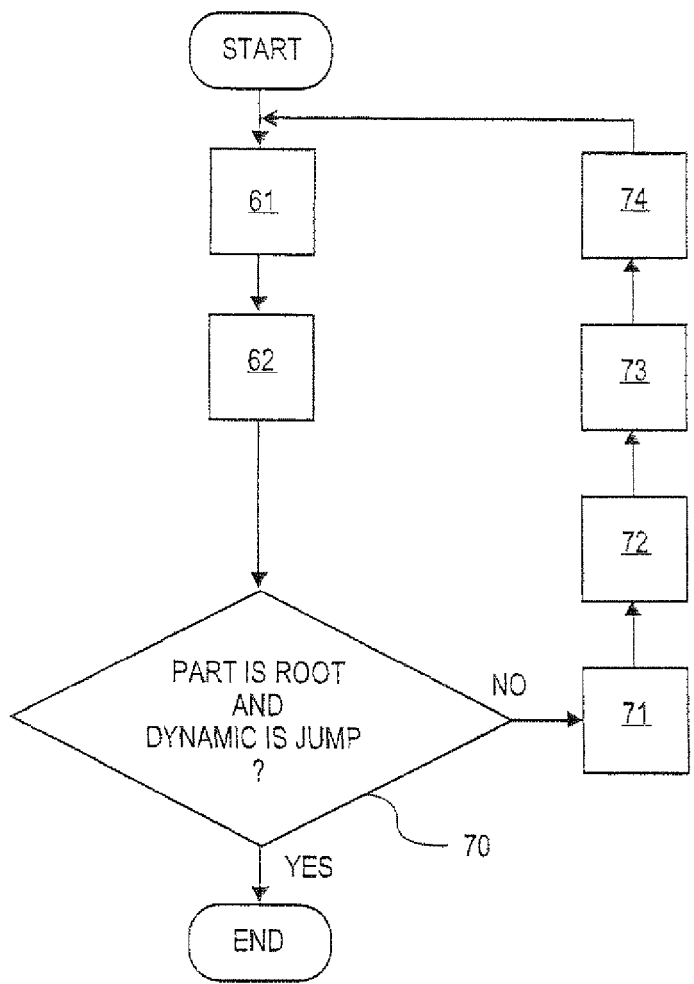
FIG. 4 shows a flowchart of local optimization under data-driven Markov chain Monte Carlo (DDMCMC) framework according to an embodiment of the present invention.

Local optimization under the DDMCMC framework is performed next as shown in FIG. 4 in an embodiment of the present invention. First, a body part is chosen 61 based on part weights. Then, a dynamic is chosen 62 based on part dynamic probabilities. If the part chosen is the root and the dynamic is jump 70, then the local optimization of the tree is completed. Otherwise, a part state is further chosen 71 based on state probabilities of associated dynamic. These probabilities may be state jump probabilities or state diffusion probabilities, depending on which dynamic was chosen before. Then, the dynamic is run 72 on the chosen part state. After that, a decision is made 73 as whether to accept the new states or not. Then, the probabilities propagation is run 74 in which part priorities, part dynamics probabilities, and state dynamic probabilities change and propagate in certain rules. The process described above is run repeatedly until a local maximum is reached.

The importance proposal probabilities and the part priorities are described next. A body part is chosen based on part weights which can be determined by a product of importance proposal probability and part priority. The importance proposal probability measures an extent, or degree, of the body part agreeing with the foreground. A body is synthesized based on the body states and then compared with the foreground. The following aspects are considered when calculating the part's importance proposal probability: (1) the area of background in the synthesized body part region; (2) the foreground uncovered by the synthesized body near the part; and (3) the area overlapping with other parts. Thus, the importance proposal probability, $P_i$, is given by $$P_i \propto (S_{bgIn}/S)+w(S_{fgOut})(S+S_o)/(S^2) \quad \text{formula (5)}$$

Where $S_{bgIn}$ is the area of background in the part; $S_{fgOut}$ is the area of uncovered foreground nearby; $S_o$ is the area of overlapping region with other parts; S is the area of the part; and w is a weight coefficient. In terms of formula (5), a body part with a large area of background or overlapping region inside, or large area of uncovered foreground nearby should be more likely to be chosen. The image edge is not considered when calculating importance proposal probability because sometimes bad image edge with a large amount of noise will introduce inefficiency and instability in computation.

Merely considering importance proposal probability when choosing a body part is not sufficient since the tree, or body topology, structure is not considered. Sometimes, a parent node in a tree should be chosen to change before its children even if the children have larger importance proposal probabilities. This is because children node is controlled by its parent. For this reason, priority may be added for each body part. By selecting a correct priority, a part with smaller importance proposal probabilities may have larger part weight so that it becomes more likely to be chosen. Considering both of these two items will utilize visual cues and image observations, as well as fit the tree structure. Consequently, the state space may be explored much more efficiently.

Next, Metropolis Hastings approach is described. After a body part is chosen, a dynamic is chosen based on part dynamic probabilities. Then, a state is chosen based on state probabilities of the associated dynamic if local optimization does not end. After running the dynamic, a decision is made whether to accept the new states or not by using a Metropolis Hastings approach in which the probability of accepting new states X' at current states X is given by the following:

$$P(X \to X')=\min\{1,[(P(X'|I)P(X|X')]/[P(X|I)P(X'|X)]\} \quad \text{formula (6)}$$

It is assumed that P(X|X')=P(X'|X) for simplicity. A factor k (k>1) may be added to formula 6 to decrease the probability of accepting bad states, then the following will result:

$$P(X \to X')=\min\{1,[P(X'|I)/P(X|I)]^k\} \quad \text{formula (7)}$$

Probabilities propagation is described next. The part priorities, the part dynamic probabilities, and the state dynamic probabilities may change and propagate after running dynamic. By designing an appropriate probabilities propagation mechanism, a nearly ideal optimization process may be achieved on the tree structure. The propagation mechanism is as follows:

(a) If diffusion happens, the priority of this part and the state diffusion probability fall; if the part has children, the priorities of its children rise, else the priority of its parent rises and its part diffusion probability decreases;

(b) If jump happens, the part jump probability and the state jump probability decrease, the part priority falls, while the priority of it parent rises and the part jump probability of its parent increases;

Both part dynamic probabilities and state dynamic probabilities will be normalized. Parts priorities will propagate equivalently so that the total priorities of all parts will keep invariable. Such a process will occur in the process of pose estimation with great probability: diffusions on limbs (upper and lower arms and legs) happen to get a local maximum, then jump helps get out of the local maximum and to state space nearby, and this process is repeated until a new torso is sampled.

Figure 5:
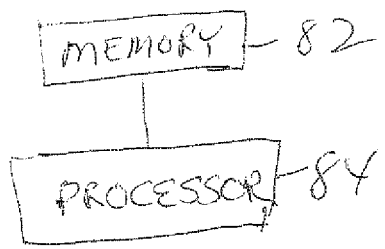
FIG. 5 is a hardware depiction of one embodiment.

An apparatus 80 shown in FIG. 5 comprises a memory 82 and a processor 84 coupled to said memory to perform a sequence comprising choosing a body part, choosing a dynamic, choosing a part state, running dynamic on said part state, deciding whether to accept new states or not, running probabilities propagation, and repeating until reach local maximum. The processor may use a data-driven Markov chain Monte Carlo framework. The processor may use a Metropolis Hastings approach. The processor may use a Bayesian inference and estimating observation likelihood by considering a product of foreground region likelihood and edge likelihood. The processor may measure constraints of said human body including spatial relations on location and orientation between two connected parts and length relations among said parts.

At least one non-transitory computer readable medium may store instructions to perform a sequence of local optimization of a tree structure of a human body comprising choosing a body part, choosing a dynamic, choosing a part state, running dynamic on said part state, deciding whether to accept new states or not, running probabilities propagation, and repeating until reach local maximum. The dynamic may comprise: jump. The dynamic may comprise: diffusion. The local optimization may comprise: data-drive Markov chain Monte Carlo (DDMCMC) framework. Deciding may include whether to accept new states or not comprises: Metropolis Hastings approach. The medium may store instructions to use a Bayesian inference and estimating observation likelihood by considering a product of foreground region likelihood and edge likelihood. The medium may also store instructions to measure constraints of said human body including spatial relations on location and orientation between two connected parts and length relations among said parts.

Many embodiments and numerous details have been set forth above in order to provide a thorough understanding of the present invention. One skilled in the art will appreciate that many of the features in one embodiment are equally applicable to other embodiments. One skilled in the art will also appreciate the ability to make various equivalent substitutions for those specific materials, processes, dimensions, concentrations, etc. described herein. It is to be understood that the detailed description of the present invention should be taken as illustrative and not limiting, wherein the scope of the present invention should be determined by the claims that follow.

What is claimed is:

1. A method of local optimization of a tree structure of a human body comprising:
   choosing a body part;
   choosing a dynamic;
   choosing a part state;
   running dynamic on said part state;
   deciding whether to accept new states or not;
   running probabilities propagation; and
   repeating until reach local maximum.

2. The method of claim 1 wherein said dynamic comprises: jump.

3. The method of claim 1 wherein said dynamic comprises: diffusion.

4. The method of claim 1 wherein said method of local optimization comprises: data-drive Markov chain Monte Carlo (DDMCMC) framework.

5. The method of claim 1 wherein said deciding whether to accept new states or not comprises: Metropolis Hastings approach.

6. The method of claim 1 comprising: using a Bayesian inference and estimating observation likelihood by considering a product of foreground region likelihood and edge likelihood.

7. The method of claim 1 further comprising: measuring constraints of said human body including spatial relations on location and orientation between two connected parts and length relations among said parts.

8. An apparatus comprising:
   a memory; and
   a processor coupled to said memory to perform a sequence comprising choosing a body part, choosing a dynamic, choosing a part state, running dynamic on said part state, deciding whether to accept new states or not, running probabilities propagation, and repeating until reach local maximum.

9. The apparatus of claim 8 wherein said sequence includes using a data-driven Markov chain Monte Carlo framework.

10. The apparatus of claim 8 wherein deciding includes using a Metropolis Hastings approach.

11. The apparatus of claim 8 including using a Bayesian inference and estimating observation likelihood by considering a product of foreground region likelihood and edge likelihood.

12. The apparatus of claim 8 including measuring constraints of said human body including spatial relations on location and orientation between two connected parts and length relations among said parts.

13. At least one non-transitory computer readable medium storing instructions to perform a sequence of local optimization of a tree structure of a human body comprising:
   choosing a body part;
   choosing a dynamic;
   choosing a part state;
   running dynamic on said part state;
   deciding whether to accept new states or not;
   running probabilities propagation; and
   repeating until reach local maximum.

14. The medium of claim 13 wherein said dynamic comprises: jump.

15. The medium of claim 13 wherein said dynamic comprises: diffusion.

16. The medium of claim 13 wherein said sequence of local optimization comprises: data-drive Markov chain Monte Carlo (DDMCMC) framework.

17. The medium of claim 13 wherein said deciding whether to accept new states or not comprises: Metropolis Hastings approach.

18. The medium of claim 13 comprising: using a Bayesian inference and estimating observation likelihood by considering a product of foreground region likelihood and edge likelihood.

19. The medium of claim 13 further comprising: measuring constraints of said human body including spatial relations on location and orientation between two connected parts and length relations among said parts.

* * * * *